(12) United States Patent
Podder et al.

(10) Patent No.: US 10,248,718 B2
(45) Date of Patent: Apr. 2, 2019

(54) GENERATING A DOMAIN ONTOLOGY USING WORD EMBEDDINGS

(71) Applicant: Accenture Global Solutions Limited, Dublin (IE)

(72) Inventors: Sanjay Podder, Thane (IN); Niharika Gupta, Bareilly (IN); Annervaz Karukapadath Mohamedrasheed, Bangalore (IN); Shubhashis Sengupta, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 329 days.

(21) Appl. No.: 15/189,569

(22) Filed: Jun. 22, 2016

(65) Prior Publication Data
US 2017/0004208 A1 Jan. 5, 2017

(30) Foreign Application Priority Data
Jul. 4, 2015 (IN) .......................... 3427/CHE/2015

(51) Int. Cl.
G06F 17/27 (2006.01)
G06F 17/30 (2006.01)

(52) U.S. Cl.
CPC .... *G06F 17/30713* (2013.01); *G06F 17/2785* (2013.01); *G06F 17/30011* (2013.01); *G06F 17/3071* (2013.01); *G06F 17/30734* (2013.01)

(58) Field of Classification Search
CPC ......... G06F 17/30734; G06F 17/30705; G06F 17/3071; G06F 17/30713; G06F 17/2785; G06F 17/30011
USPC ....................................................... 707/738
See application file for complete search history.

(56) References Cited

U.S. PATENT DOCUMENTS

| 2007/0156665 | A1* | 7/2007 | Wnek ................. G06F 17/3071 |
| 2008/0021700 | A1* | 1/2008 | Moitra .............. G06F 17/30734 704/9 |
| 2008/0154578 | A1* | 6/2008 | Xu ...................... G10L 15/1815 704/4 |
| 2009/0094020 | A1  | 4/2009 | Marvit et al. |

(Continued)

FOREIGN PATENT DOCUMENTS

| JP | 2005063157 | 10/2005 |
| JP | 2009294938 | 12/2009 |

OTHER PUBLICATIONS

Fu et al., "Learning Semantic Hierarchies via Word Embeddings", Proceedings of the 52nd Annual Meeting of the Associations of Computational Linguistics, pp. 1199-1209, Baltimore, Maryland, USA, on Jun. 23-35, 2014, as cited on the IDS of (Year: 2014).*

(Continued)

*Primary Examiner* — David T. Brooks
(74) *Attorney, Agent, or Firm* — Harrity & Harrity, LLP

(57) ABSTRACT

A device may receive a text, from a text source, in association with a request to generate an ontology for the text. The device may generate a set of word vectors from a list of terms determined from the text. The device may determine a quantity of term clusters to be generated to form the ontology based on the set of word vectors. The device may generate term clusters based on the quantity of term clusters, attributes, and/or non-hierarchical relationships. The term clusters may be associated with concepts of the ontology. The device may provide the term clusters for display via a user interface associated with a device.

20 Claims, 12 Drawing Sheets

(56) References Cited

U.S. PATENT DOCUMENTS

| | | | |
|---|---|---|---|
| 2009/0094208 A1* | 4/2009 | Marvit | G06F 17/30616 |
| 2009/0094233 A1* | 4/2009 | Marvit | G06F 17/30616 |
| 2009/0198642 A1* | 8/2009 | Akkiraju | G06N 5/02 706/54 |
| 2010/0030552 A1* | 2/2010 | Chen | G06F 17/30734 704/9 |
| 2013/0204885 A1* | 8/2013 | Clinchant | G06K 9/4676 707/756 |
| 2013/0232147 A1* | 9/2013 | Mehra | G06F 17/30731 707/737 |
| 2014/0222419 A1* | 8/2014 | Romano | G06N 5/022 704/10 |
| 2014/0317074 A1* | 10/2014 | Song | G06F 17/30864 707/706 |
| 2015/0248478 A1* | 9/2015 | Skupin | G06F 17/30734 707/609 |
| 2016/0004701 A1* | 1/2016 | Kim | G06F 17/30705 707/750 |
| 2016/0275152 A1* | 9/2016 | Gunjan | G06N 5/02 |

OTHER PUBLICATIONS

Bengio et al., "A Neural Probabilistic Language Model," Journal of Machine Learning Research 3, Feb. 2003, 19 pages.

Bergstra et al., "Theano: A CPU and GPU Math Compiler in Python," Proc. of the 9th Python in Science Conf. (SCIPY 2010), https://www.academia.edu/2816486/Theano_A_CPU_and_GPU_Math_Compiler_in_Python?auto=download, Mar. 29, 2011, 7 pages.

Biemann, "Ontology Learning from Text: A Survey of Methods," http://www.jlcl.org/2005_Heft2/Chris_Biemann.pdf, 2005, 19 pages.

Bird et al., "NLTK: The Natural Language Toolkit," http://www.aclweb.org/anthology/P04-3031, Aug. 3, 2004, 4 pages.

Bishop, "Pattern Recognition and Machine Learning," https://www.cs.princeton.edu/courses/archive/spring07/cos424/papers/bishop-regression.pdf, Dec. 25, 2006, 758 pages.

Buitelaar et al., "Ontology Learning from Text: Methods, Evaluation and Applications,".

Fensel, "Ontologies: Silver Bullet for Knowledge Management and Electronic Commerce," http://citeseerx.ist.psu.edu/viewdoc/download?doi=10.1.1.70.6488&rep=rep1&type=pdf, Feb. 2000, 108 pages.

Haykin, "Neural Networks: A Comprehensive Foundation," https://cdn.preterhuman.net/texts/science_and_technology/artificial_intelligence/Neural%20Networks%20-%20A%20Comprehensive%20Foundation%20-%20Simon%20Haykin.pdf, 1994, 823 pages.

Hearst, "Automatic Acquisition of Hyponyms from Large Text Corpora," http://people.ischool.berkeley.edu/~hearst/papers/coling92.pdf, Jul. 1992, 8 pages.

Jain, "Data Clustering: 50 Years beyond K-means," http://www.sciencedirect.com/science/article/pii/S0167865509002323, Sep. 9, 2009, 16 pages.

Madhulatha, "An Overview on Clustering Methods," https://arxiv.org/abs/1205.1117, Apr. 2012, 7 pages.

Maedche et al., "Ontology Learning for the Semantic Web," http://www.aifb.kit.edu/images/1/18/2001_454_Maedche_Ontology_Learni_1.pdf, Feb. 1, 2002, 18 pages.

Mikolov et al., "Efficient Estimation of Word Representations in Vector Space," https://arxiv.org/pdf/1301.3781.pdf, Jan. 16, 2013, 12 pages.

Mikolov et al., "Linguistic Regularities in Continuous SpaceWord Representations," http://www.aclweb.org/anthology/N13-1090, Jun. 9, 2013, 6 pages.

Miller, "WordNet: A Lexical Database for English," http://nlp.cs.swarthmore.edu/~richardw/papers/miller1995-wordnet.pdf, Nov. 1995, 3 pages.

Pedregosa et al., "Scikit-learn: Machine Learning in Python," http://www.jmlr.org/papers/volume12/pedregosa11a/pedregosa11a.pdf, Oct. 2011, 6 pages.

Pennington et al., "GloVe: Global Vectors forWord Representation," http://www-nlp.stanford.edu/pubs/glove.pdf, Aug. 1, 2014, 12 pages.

Řehůřrk et al., "Software Framework for Topic Modelling with Large Corpora," https://radimrehurek.com/gensim/lrec2010_final.pdf, Mar. 27, 2010, 5 pages.

Rosenberg et al., "V-Measure: A conditional entropy-based external cluster evaluation Measure," https://aclweb.org/anthology/D/D07/D07-1043.pdf, May 31, 2007, 11 pages.

Rousseeuw, "Silhouettes: a graphical aid to the interpretation and validation of cluster analysis," http://www.sciencedirect.com/science/article/pii/0377042787901257, Nov. 27, 1986, 13 pages.

Socher et al., "Recursive Deep Models for Semantic Compositionality Over a Sentiment Treebank," http://nlp.stanford.edu/~socherr/EMNLP2013_RNTN.pdf, Sep. 5, 2013, 12 pages.

Tibshirani et al., "Estimating the number of clusters in a data set via the gap statistic," http://www.web.stanford.edu/~hastie/Papers/gap.pdf, Nov. 2000, 13 pages.

Tjong et al., "Introduction to the CoNLL-2000 Shared Task: Chunking," http://www.cnts.ua.ac.be/conll2000/pdf/12732tjo.pdf, 2000, 6 pages.

Wong et al., "Ontology Learning from Text: A Look Back and into the Future," ACM Computing Surveys (CSUR), vol. 44 Issue 4, Aug. 2012, 36 pages.

Widdows et al., "Semantic Vectors: A Scalable Open Source Package and Online Technology Management Application," LREC, http://www.lrec-conf.org/proceedings/lrec2008/pdf/300_paper.pdf, May 2008, 8 pages.

Chen et al., "Semantic Information Extraction for Improved Word Embeddings," Proceedings of NAACL-HLT 2015, May 31-Jun. 5, 2015, pp. 168-175.

Fu et al., "Learning Semantic Hierarchies via Word Embeddings," Proceedings of the 52$^{nd}$ Annual Meeting of the Association for Computational Linguistics, Jun. 23-25, 2014, pp. 1199-1209.

Tang, "Improved K-means Clustering Algorithm Based on User Tag," Journal of Convergence Technology, vol. 5, No. 10, Dec. 2010, 7 pages.

Ruiji Fu et al., "Learning Semantic Hierarchies via Word Embeddings", Jun. 2014, 11 pages.

Wikipedia, "Language model," https://en.wikipedia.org/wiki/Language_model, Mar. 14, 2016, 4 pages.

Wikipedia, "Latent semantic indexing," https://en.wikipedia.org/wiki/Latent_semantic_indexing, Feb. 11, 2016, 10 pages.

Wikipedia, "Natural language processing," https://en.wikipedia.org/wiki/Natural_language_processing, Apr. 21, 2016, 10 pages.

Wikipedia, "Ontology learning," https://en.wikipedia.org/wiki/Ontology_learning, Apr. 20, 2016, 4 pages.

Wikipedia, "Silhouette (clustering)," https://en.wikipedia.org/wiki/Silhouette_(clustering), Apr. 25, 2016, 2 pages.

Wikipedia, "Word embedding," https://en.wikipedia.org/wiki/Word_embedding, May 1, 2016, 2 pages.

Widdows et al., "Semantic Vectors: A Scalable Open Source Package and Online Technology Management Application", May 2008, 8 pages.

Chen et al., "Semantic Information Extraction for Improved Word Embeddings", Proceedings of NAACL-HLT 2015, May 31, 2018, 8 pages.

* cited by examiner

GENERATING A DOMAIN ONTOLOGY USING WORD EMBEDDINGS

RELATED APPLICATION

This application claims priority under 35 U.S.C. § 119 to Indian Provisional Patent Application No. 3427/CHE/2015, filed on Jul. 4, 2015, the content of which is incorporated by reference herein in its entirety.

BACKGROUND

Ontology learning may include automatic or semi-automatic creation of ontologies. An ontology may include a formal naming and definition of the types, properties, and/or interrelationships of entities for a particular domain of discourse. When creating an ontology, a device may extract a domain's terms, concepts, and/or noun phrases from a corpus of natural language text. In addition, the device may extract relationships between the terms, the concepts, and/or the noun phrases. In some cases, the device may use a processor, such as a linguistic processor, to extract the terms, the concepts, and/or the noun phrases using part-of-speech tagging and/or phrase chunking.

SUMMARY

According to some possible implementations, a device may include one or more processors. The one or more processors may generate a set of word vectors from a list of terms determined from a text using a vector model associated with generating the set of word vectors. The one or more processors may determine a quantity of term clusters, to be generated to form an ontology of terms in the text, based on the set of word vectors and using a statistical technique. The one or more processors may generate term clusters, representing concepts of the ontology of terms, based on the quantity of term clusters and using a clustering technique. The one or more processors may output the term clusters to permit another device to analyze a set of documents using the term clusters.

According to some possible implementations, a non-transitory computer-readable medium may store one or more instructions that, when executed by one or more processors, cause the one or more processors to receive a text, from a text source, in association with a request to generate an ontology for the text. The one or more instructions may cause the one or more processors to generate a set of word vectors from a list of terms determined from the text. The one or more instructions may cause the one or more processors to determine a quantity of term clusters to be generated to form the ontology based on the set of word vectors. The one or more instructions may cause the one or more processors to generate term clusters based on the quantity of term clusters. The term clusters may be associated with concepts of the ontology. The one or more instructions may cause the one or more processors to provide the term clusters for display via a user interface associated with a device.

According to some possible implementations, a method may include generating, by a device, a set of word vectors from a list of terms determined from a text. The method may include determining, by the device, a quantity of term clusters, to be generated to form an ontology of terms in the text, based on the set of word vectors. The method may include generating, by the device, term clusters based on the quantity of term clusters. The method may include determining, by the device, term sub-clusters associated with the term clusters. The method may include generating, by the device, a hierarchy of term clusters for the ontology of terms based on the term clusters and the term sub-clusters. The method may include providing, by the device, the term clusters and the term sub-clusters to permit processing of another text.

DETAILED DESCRIPTION

The following detailed description of example implementations refers to the accompanying drawings. The same reference numbers in different drawings may identify the same or similar elements.

An ontology may be used for a variety of applications, such as information sharing by a computer system or processing and understanding natural language text by the computer system. For example, in a pharmacovigilance context, the computer system may use the ontology to map natural language text, such as "The patient was started with drug x for infection 23rd December," to concepts of a domain (e.g., concepts of a medical domain, such as person, drug, disease, and/or date). In addition, the computer system may use ontology learning to map relationships between the concepts of the domain associated with the natural language text. The computer system may map the natural language text to the concepts and the relationships between the concepts in the ontology to enable processing of the natural language text.

Creation of the ontology may include the use of one or more techniques. For example, the computer system may use automatic or semi-automatic techniques, such as latent semantic indexing (LSI), continuous bag of words (CBOW), skip-gram, or global vector (GloVe). In some cases, the automatic or semi-automatic techniques may have limited effectiveness depending on a quantity of terms included in the natural language text. As another example, manual creation of the ontology may be used, however, manual creation may be labor-intensive, time-consuming, and/or costly.

Implementations described herein may enable a device (e.g., a client device or a computing resource of a cloud computing environment) to automatically generate a domain-specific ontology from natural language text, using distributed word vectors or word embeddings (e.g., vector representations of real numbers for each word) learned from natural language text. The device may utilize the distributed word vectors to identify concepts of a domain, attributes of the concepts, taxonomical relationships between the concepts, and/or non-taxonomical relationships among the concepts and/or attributes from natural language text. This may enable the device to create the ontology and/or perform ontology learning more effectively than other techniques, thereby improving generation of the ontology.

Figure 1A:
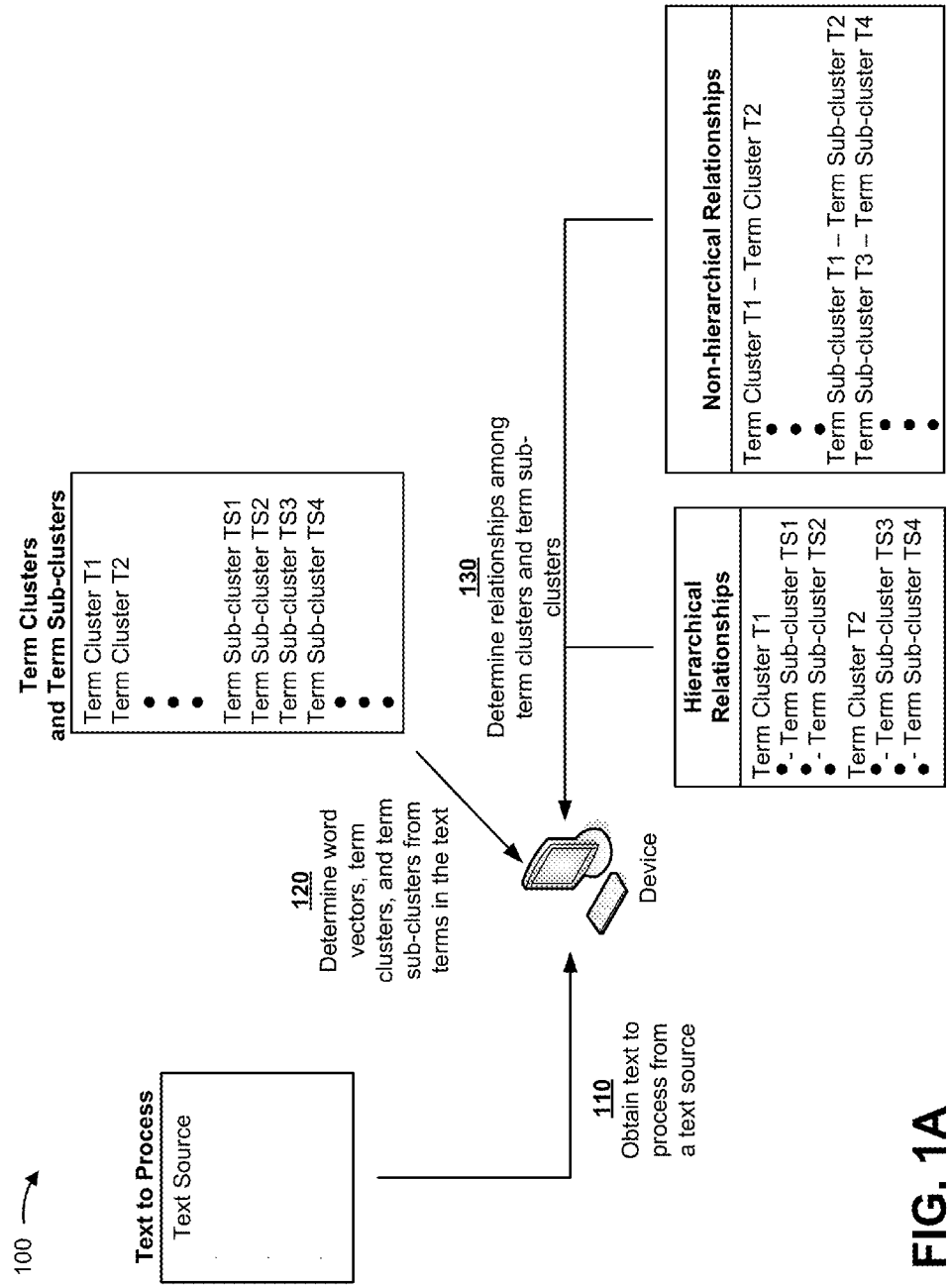
FIGS. 1A and 1B are diagrams of an overview of an example implementation described herein.
Figure 1B:
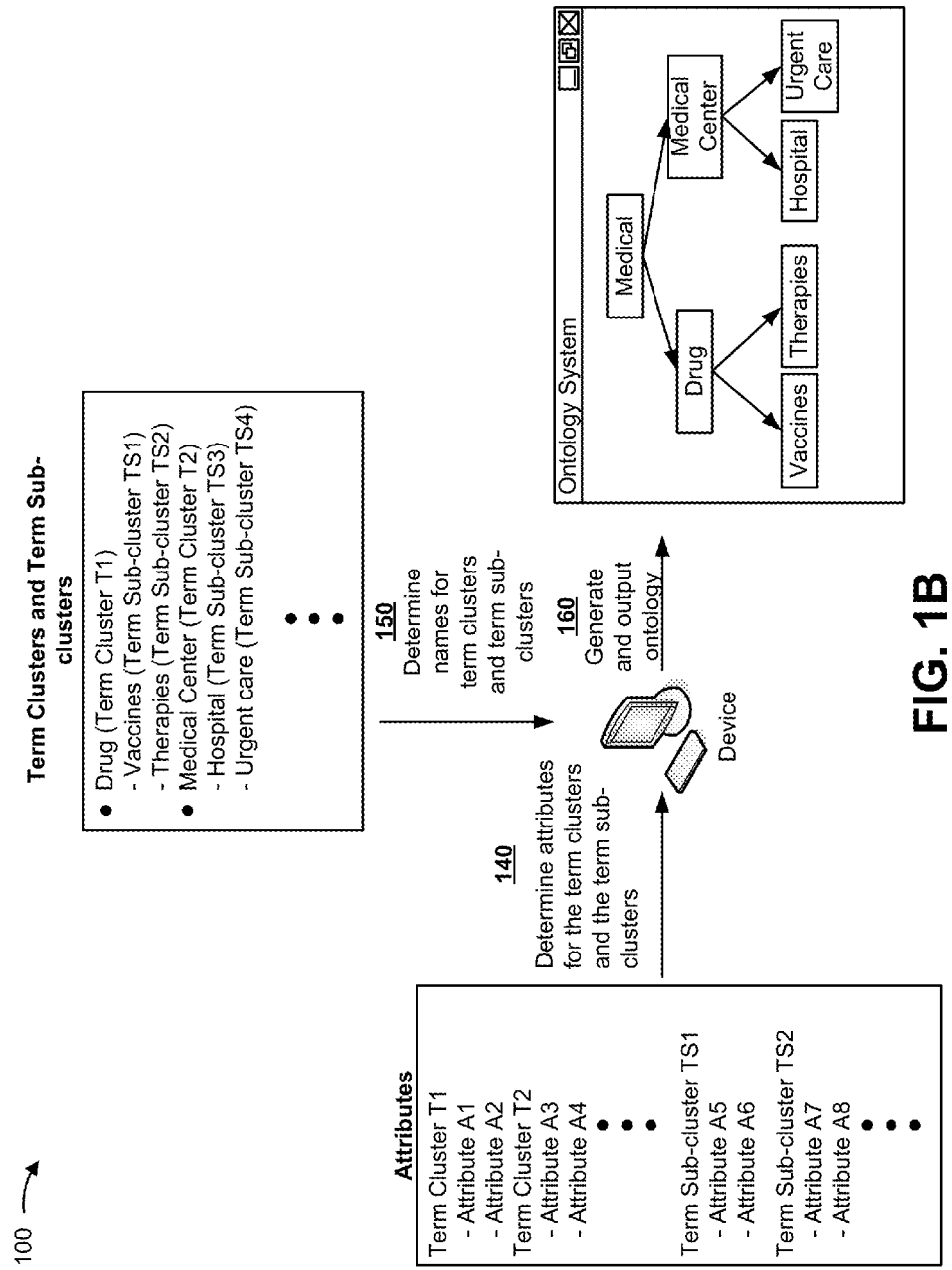

FIGS. 1A and 1B are diagrams of an overview of an example implementation 100 described herein. As shown in FIG. 1A, and by reference number 110, a device (e.g., a client device or a cloud device) may obtain, from a text source, text to process (e.g., natural language text or unstructured domain data). For example, the device may obtain the text when a user identifies a text source, such as a file or a website that includes the text. As shown by reference number 120, the device may determine term clusters and/or term sub-clusters from terms in the text. For example, the device may determine a word vector for the terms (e.g., a numerical representation of the term) and may group the word vectors into clusters, representing term clusters and/or term sub-clusters.

As shown by reference number 130, the device may determine relationships among the term clusters and/or the term sub-clusters. For example, the device may determine hierarchical and non-hierarchical relationships among the term clusters and the term sub-clusters. As shown, the device may determine that term sub-clusters TS1 and TS2 are hierarchically associated with term cluster T1 and that term sub-clusters TS3 and TS4 are hierarchically associated with term cluster T2. In addition, the device may determine that term cluster T1 is non-hierarchically associated with term cluster T2, that term sub-cluster TS1 is non-hierarchically associated with term sub-cluster TS2, and that term sub-cluster TS3 is non-hierarchically associated with term sub-cluster TS4.

As shown in FIG. 1B, and by reference number 140, the device may determine attributes for the term clusters and the term sub-clusters. For example, the device may determine that attributes A1 and A2 are associated with term cluster T1, that attributes A3 and A4 are associated with term cluster T2, that attributes A5 and A6 are associated with term sub-cluster TS1, and so forth. The device may identify the attributes from terms included in the text. As shown by reference number 150, the device may determine names (e.g., human-readable identifiers) for the term clusters and/or the term sub-clusters. The device may use the names to generate a human-readable ontology of terms. As shown by reference number 160, the device may generate and output the ontology of terms (e.g., via a user interface associated with the device).

In this way, a device may generate an ontology of terms using word vectors and a technique for clustering the word vectors. In addition, the device may determine hierarchical and non-hierarchical relationships among the word vectors. This improves an accuracy of generating the ontology (e.g., relative to other techniques for generating an ontology), thereby improving the quality of the generated ontology.

As indicated above, FIGS. 1A and 1B are provided merely as an example. Other examples are possible and may differ from what was described with regard to FIGS. 1A and 1B.

Figure 2:
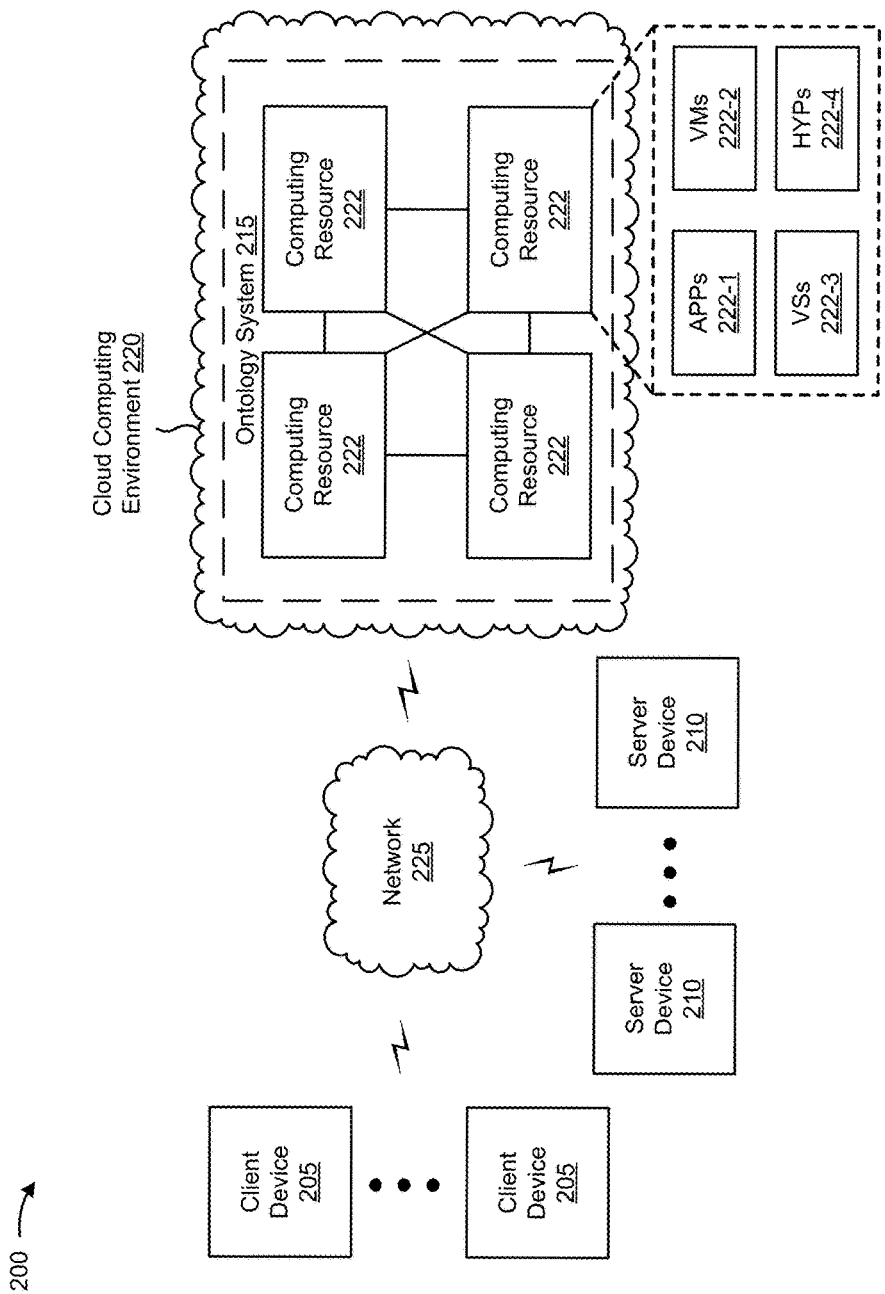
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include one or more client devices 205 (hereinafter referred to collectively as "client devices 205," and individually as "client device 205"), one or more server devices 210 (hereinafter referred to collectively as "server devices 210," and individually as "server device 210"), an ontology system 215 hosted within a cloud computing environment 220, and a network 225. Devices of environment 200 may interconnect via wired connections, wireless connections, or a combination of wired and wireless connections.

Client device 205 includes one or more devices capable of receiving, generating, storing, processing, and/or providing information associated with generating an ontology of terms. For example, client device 205 may include a computing device, such as a desktop computer, a laptop computer, a tablet computer, a server device, a mobile phone (e.g., a smart phone or a radiotelephone) or a similar type of device. In some implementations, client device 205 may identify text to process and provide information identifying a text source for the text to ontology system 215, as described in more detail elsewhere herein.

Server device 210 includes one or more devices capable of receiving, storing, processing, and/or providing information associated with text for use by ontology system 215. For example, server device 210 may include a server or a group of servers. In some implementations, ontology system 215 may obtain information associated with text or obtain text to be processed from server device 210.

Ontology system 215 includes one or more devices capable of obtaining text to be processed, processing the text, and/or generating an ontology using the text, as described elsewhere herein. For example, ontology system 215 may include a cloud server or a group of cloud servers. In some implementations, ontology system 215 may be designed to be modular such that certain software components can be swapped in or out depending on a particular need. As such, ontology system 215 may be easily and/or quickly reconfigured for different uses.

In some implementations, as shown, ontology system 215 may be hosted in cloud computing environment 220. Notably, while implementations described herein describe ontology system 215 as being hosted in cloud computing environment 220, in some implementations, ontology system 215 may not be cloud-based (i.e., may be implemented outside of a cloud computing environment) or may be partially cloud-based.

Cloud computing environment 220 includes an environment that hosts ontology system 215. Cloud computing environment 220 may provide computation, software, data access, storage, etc. services that do not require end-user (e.g., client device 205) knowledge of a physical location and configuration of system(s) and/or device(s) that hosts ontology system 215. As shown, cloud computing environment 220 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host ontology system 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, one or more virtualized storages ("VSs") 222-3, or one or more hypervisors ("HYPs") 222-4.

Application 222-1 includes one or more software applications that may be provided to or accessed by client device 205. Application 222-1 may eliminate a need to install and execute the software applications on client device 205. For example, application 222-1 may include software associated with ontology system 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 205), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 225 may include one or more wired and/or wireless networks. For example, network 225 may include a cellular network (e.g., a long-term evolution (LTE) network, a third generation (3G) network, or a code division multiple access (CDMA) network), a public land mobile network (PLMN), a local area network (LAN), a wide area network (WAN), a metropolitan area network (MAN), a telephone network (e.g., a Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
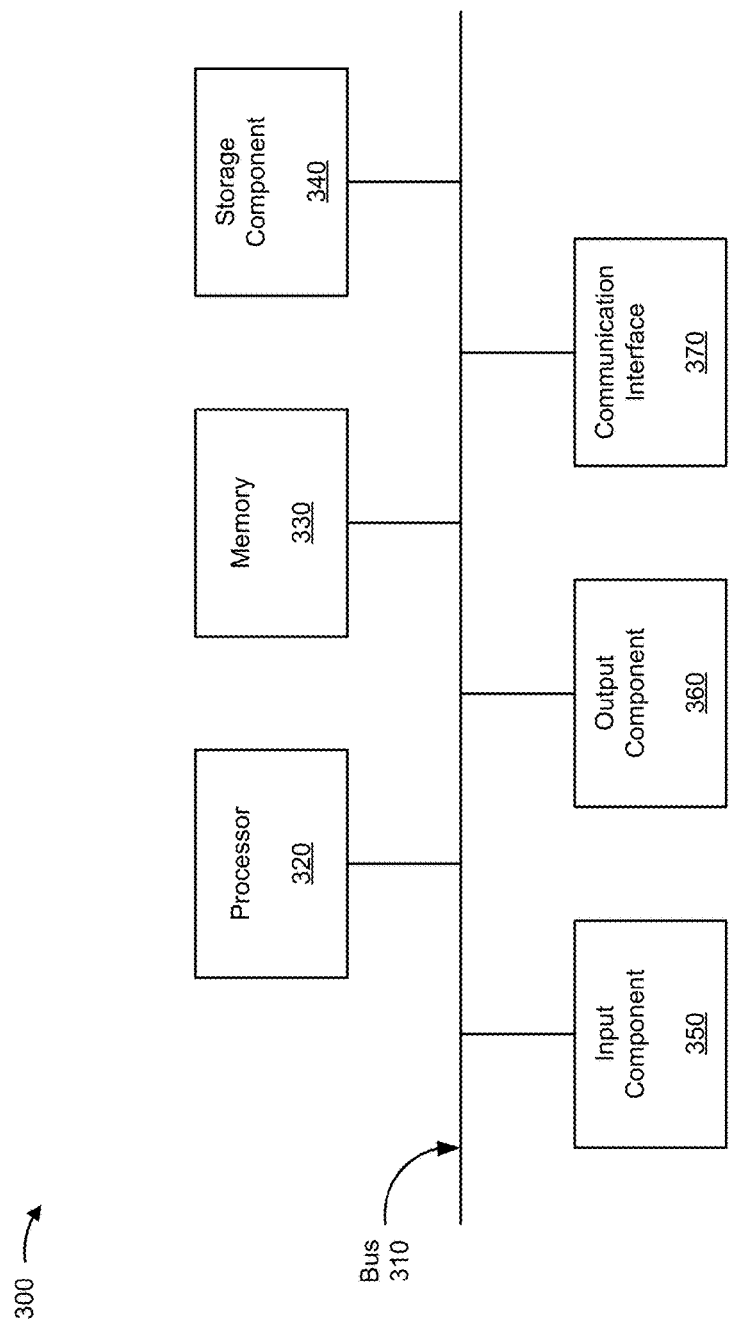
FIG. 3 is a diagram of example components of one or more devices of FIG. 2.

FIG. 3 is a diagram of example components of a device 300. Device 300 may correspond to client device 205, server device 210, and/or ontology system 215. In some implementations, client device 205, server device 210, and/or ontology system 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, or a cellular network interface.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
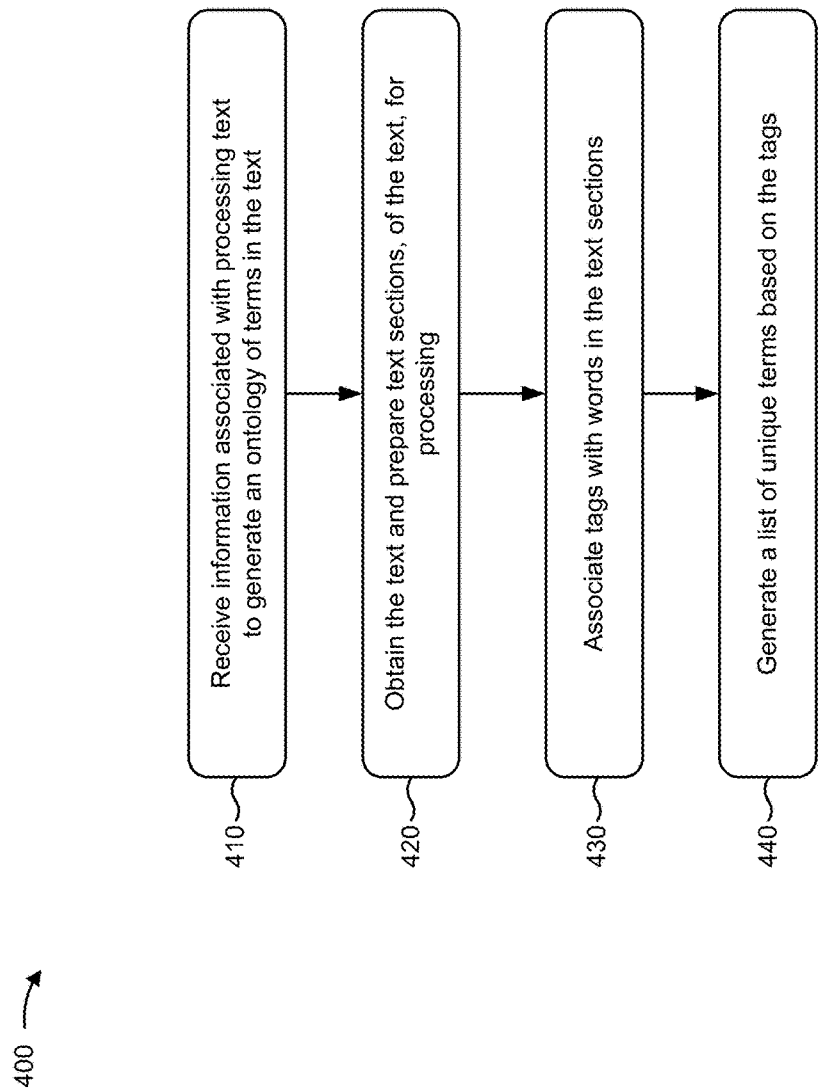
FIG. 4 is a flow chart of an example process for preparing text for processing to generate an ontology of terms in text.

FIG. 4 is a flow chart of an example process 400 for preparing text for processing to generate an ontology of terms in the text. In some implementations, one or more process blocks of FIG. 4 may be performed by client device 205. While all process blocks of FIG. 4 are described herein as being performed by client device 205, in some implementations, one or more process blocks of FIG. 4 may be performed by another device or a group of devices separate from or including client device 205, such as server device 210 and ontology system 215.

As shown in FIG. 4, process 400 may include receiving information associated with processing text to generate an ontology of terms in the text (block 410). For example, client device 205 may receive information that identifies text to be processed, may receive information associated with identifying terms in the text, and/or may receive information associated with generating an ontology using the text.

Client device 205 may receive, via input from a user and/or another device, information that identifies text to be processed. For example, a user may input information identifying the text or a memory location at which the text is stored (e.g., local to and/or remote from client device 205). The text may include, for example, a document that includes text (e.g., a text file, a text document, a web document, such as a web page, or a file that includes text and other information, such as images), a group of documents that include text (e.g., multiple files, multiple web pages, multiple communications (e.g., emails, instant messages, voicemails, etc.) stored by a communication server), a portion of a document that includes text (e.g., a portion indicated by a user or a portion identified by document metadata), and/or other information that includes text. In some implementations, the text may include natural language text. In some implementations, client device 205 may receive an indication of one or more sections of text to be processed.

The text may include one or more terms. A term may refer to a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, or a combination of characters that form a misspelled word.

In some implementations, a term may identify a domain (e.g., a domain of discourse, such as pharmacovigilance). Additionally, or alternatively, a term may identify a concept of the domain (e.g., a category of the domain, such as drug, disease, procedure, person, age, or date of the pharmacovigilance domain). Additionally, or alternatively, a term may identify an attribute of a concept (e.g., an aspect, a part, or a characteristic of a concept, such as age, name, birthday, or gender of the person concept). Additionally, or alternatively, a term may identify an instance of a concept (e.g., a particular object of a concept, such as Doctor Jones of the person concept). In some implementations, client device 205 may use one or more terms to generate an ontology for a particular domain, as described below.

In some implementations, client device 205 may receive, via input from a user and/or another device, information and/or instructions for identifying terms in the text. For example, client device 205 may receive a tag list that identifies tags (e.g., part-of-speech tags or user-input tags) to be used to identify terms in the text. As another example, client device 205 may receive a term list (e.g., a glossary that identifies terms in the text, a dictionary that includes term definitions, a thesaurus that includes term synonyms or antonyms, or a lexical database, such as WordNet, that identifies terms in the text (e.g., single-word terms and/or multi-word terms)).

In some implementations, client device 205 may receive, via input from a user and/or another device, information and/or instructions associated with generating the ontology. For example, client device 205 may receive information that identifies a domain associated with the text (e.g., a computer programming domain, a medical domain, a biological domain, or a financial domain). As another example, client device 205 may receive information and/or instructions for identifying concepts, attributes, and/or instances (e.g., instructions for identifying the terms like "hospital," "clinic," and/or "medical center" as a medical institution concept of the medical domain). As another example, client device 205 may receive information that identifies one or more vector models for generating a set of word vectors using the terms included in the text, such as CBOW, skip gram, or GloVe.

In some implementations, client device 205 may use CBOW to generate word vectors to determine (e.g., predict) a particular word in the text based on surrounding words that precede the particular word or follow the particular word, independent of an order of the words, in a fixed context window. In some implementations, client device 205 may use skip gram to generate word vectors to determine (e.g., predict) words in the text that surround a particular word based on the particular word. In some implementations, client device 205 may use GloVe to generate word vectors, where a dot product of two word vectors may approximate a co-occurrence statistic of corresponding words for the word vectors in the text, to determine (e.g., predict) words in the text.

As further shown in FIG. 4, process 400 may include obtaining the text and preparing text sections, of the text, for processing (block 420). For example, client device 205 may obtain the text, and may prepare the text for processing to generate the ontology of terms in the text. In some implementations, client device 205 may retrieve the text (e.g., based on user input that identifies the text or a memory location of the text). In some implementations, the text may include multiple files storing text, a single file storing text, a portion of a file storing text, multiple lines of text, a single line of text, or a portion of a line of text. Additionally, or alternatively, the text may include untagged text and/or may include tagged text that has been annotated with one or more tags.

In some implementations, client device 205 may determine text sections, of the text, to be processed. For example, client device 205 may determine a manner in which the text is to be partitioned into text sections, and may partition the text into text sections. A text section may include, for example, a sentence, a line, a paragraph, a page, or a document. Additionally, or alternatively, client device 205 may label text sections and may use the labels when processing the text. For example, client device 205 may label each text section with a unique identifier (e.g., $TS_1$, $TS_2$, $TS_3$, . . . $TS_d$, where $TS_k$ is equal to the k-th text section in the text and d is equal to the total quantity of text sections in the text). Additionally, or alternatively, client device 205 may process each text section separately (e.g., serially or in parallel).

In some implementations, client device 205 may prepare the text (e.g., one or more text sections) for processing. For example, client device 205 may standardize the text to prepare the text for processing. In some implementations, preparing the text for processing may include adjusting characters, such as by removing characters, replacing characters, adding characters, adjusting a font, adjusting formatting, adjusting spacing, removing white space (e.g., after a beginning quotation mark, before an ending quotation mark, before or after a range indicator, such as a hyphen dash, or a colon, or before or after a punctuation mark, such as a percentage sign). For example, client device 205 may replace multiple spaces with a single space, may insert a space after a left parenthesis, a left brace, or a left bracket, or may insert a space before a right parenthesis, a right brace, or a right bracket. In this way, client device 205 may use a space delimiter to more easily parse the text.

In some implementations, client device 205 may prepare the text for processing by expanding acronyms in the text. For example, client device 205 may replace a short-form acronym, in the text, with a full-form term that the acronym represents (e.g., may replace "EPA" with "Environmental Protection Agency"). Client device 205 may determine the full-form term of the acronym by, for example, using a glossary or other input text, searching the text for consecutive words with beginning letters that correspond to the acronym (e.g., where the beginning letters "ex" may be represented in an acronym by "X") to identify a potential full-form term of an acronym, or by searching for potential full-form terms that appear near the acronym in the text (e.g., within a threshold quantity of words).

As further shown in FIG. 4, process 400 may include associating tags with words in the text sections (block 430). For example, client device 205 may receive information that identifies one or more tags, and may associate the tags with words in the text based on tag association rules. The tag association rules may specify a manner in which the tags are to be associated with words, based on characteristics of the words. For example, a tag association rule may specify that a singular noun tag ("/NN") is to be associated with words that are singular nouns (e.g., based on a language database or a context analysis).

A word may refer to a unit of language that includes one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). In some implementations, client device 205 may determine words in the text by determining characters identified by one or more delimiting characters, such as a space, or a punctuation mark (e.g., a comma, a period, an exclamation point, or a question mark).

As an example, client device 205 may receive a list of part-of-speech (POS) tags and tag association rules for tagging words in the text with the POS tags based on the part-of-speech of the word. Example POS tags include NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VBZ (verb, third person singular present tense), VBN (verb, past participle), RB (adverb), RBR (adverb, comparative), RBS (adverb, superlative), JJ (adjective), JJR (adjective, comparative), JJS (adjective, superlative), CD (cardinal number), IN (preposition or subordinating conjunction), LS (list item marker), MD (modal), PRP (personal pronoun), PRP$ (possessive pronoun), TO (to), WDT (wh-determiner), WP (wh-pronoun), WP$ (possessive wh-pronoun), or WRB (wh-adverb).

In some implementations, client device 205 may generate a term corpus of terms to exclude from consideration as concepts, attributes, and/or instances by generating a data structure that stores terms extracted from the text. Client device 205 may, for example, identify terms to store in ExclusionList based on a POS tag associated with the word (e.g., VB, VBZ, IN, LS, PRP, PRP$, TO, VBD, VBG, VBN, VBP, WDT, WP, WP$, CD, and/or WRB) or based on identifying a particular word or phrase in the text (e.g., provided by a user).

In some implementations, client device 205 may further process the tagged text to associate additional or alternative tags with groups of words that meet certain criteria. For example, client device 205 may associate an entity tag (e.g., ENTITY) with noun phrases (e.g., consecutive words with a noun tag, such as /NN, /NNS, /NNP, and/or /NNPS), may associate a term tag (e.g., TERM) with unique terms (e.g., single-word terms and/or multi-word terms). In some implementations, client device 205 may process terms with particular tags, such as noun tags, entity tags, verb tags, or term tags, when identifying the terms as concepts, attributes, and/or instances of a domain.

As further shown in FIG. 4, process 400 may include generating a list of unique terms based on the tags (block 440). For example, client device 205 may generate a list of unique terms associated with one or more tags. The list of unique terms (e.g., a term corpus) may refer to a set of terms (e.g., single word terms or multi-word terms) extracted from the text. In some implementations, the term corpus may include terms tagged with a noun tag and/or a tag derived from a noun tag (e.g., an entity tag applied to words with successive noun tags or a term tag). Additionally, or alternatively, the term corpus may include terms identified based on input provided by a user (e.g., input that identifies multi-word terms, input that identifies a pattern for identifying multi-word terms, such as a pattern of consecutive words associated with particular part-of-speech tags, or a pattern of terms appearing at least a threshold quantity of times in the text), which may be tagged with a term tag in some implementations.

In some implementations, client device 205 may receive information that identifies stop tags or stop terms. The stop tags may identify tags associated with terms that are not to be included in the list of unique terms. Similarly, the stop terms may identify terms that are not to be included in the list of unique terms. When generating the list of unique terms, client device 205 may add terms to the list that are not associated with a stop tag or identified as a stop term. Additionally, or alternatively, client device 205 may add terms to the list that are not associated with a tag and/or term included in ExclusionList.

Additionally, or alternatively, client device 205 may convert terms to a root form when adding the terms to the list of unique terms. For example, the terms "process," "processing," "processed," and "processor" may be converted to the root form "process." Similarly, the term "devices" may be converted to the root form "device." In some implementations, client device 205 may add the root term "process device" to the list of unique terms.

Client device 205 may generate a term corpus by generating a data structure that stores terms extracted from the text, in some implementations. For example, client device 205 may generate a list of terms TermList of size t (e.g., with t elements), where t is equal to the number of unique terms in the text (e.g., where unique terms list TermList=[$term_1$, $term_2$, ..., $term_t$]). Additionally, or alternatively, client device 205 may store, in the data structure, an indication of an association between a term and a tag associated with the term.

As described with respect to FIG. 4, client device 205 may obtain text and process the text to generate a list of unique terms. This enables client device 205 to generate an ontology terms using the list of unique terms, as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
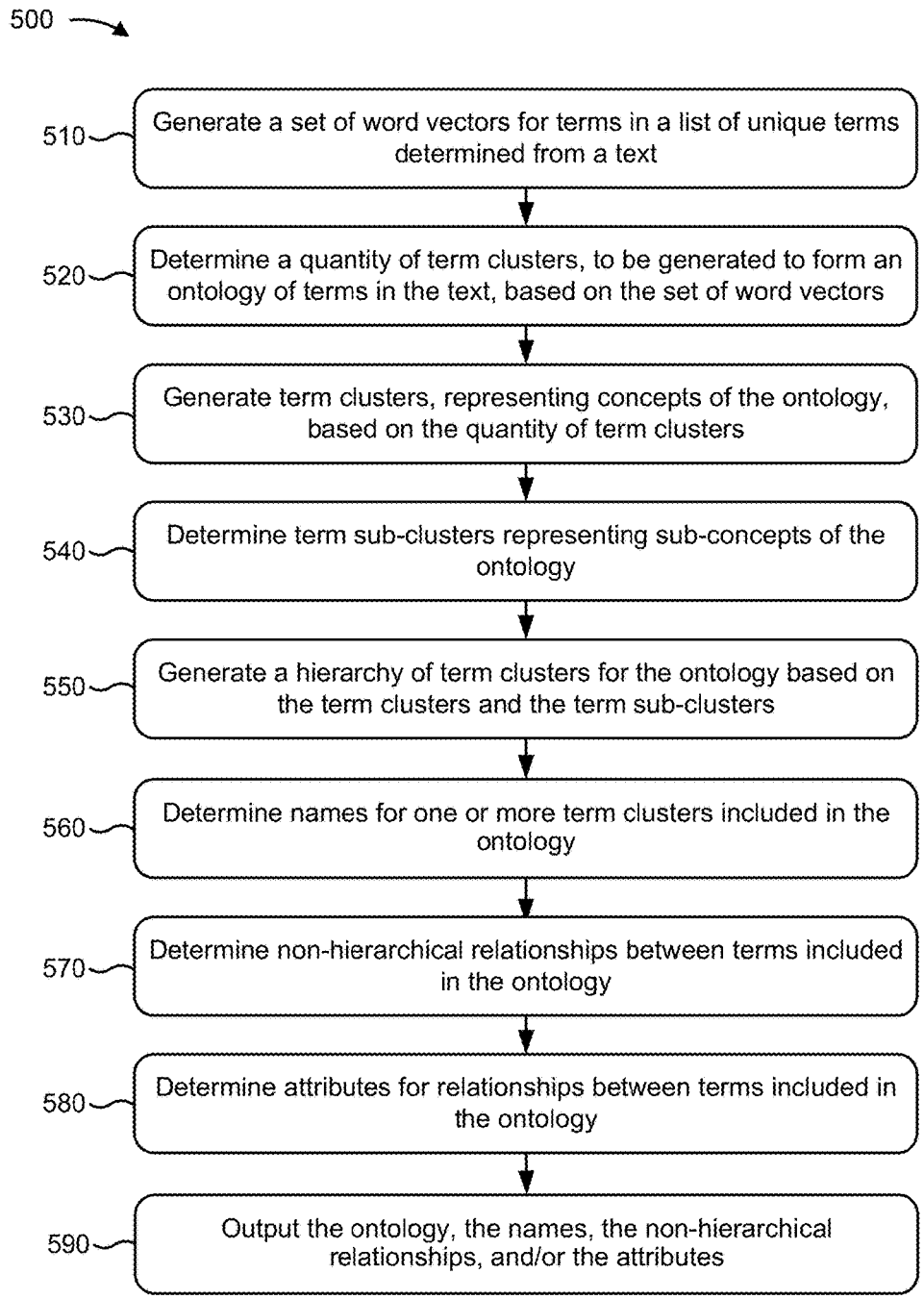
FIG. 5 is a flow chart of an example process for generating an ontology of terms in the text.

FIG. 5 is a flow chart of an example process 500 for generating an ontology of terms in text. In some implementations, one or more process blocks of FIG. 5 may be performed by client device 205. While all process blocks of FIG. 5 are described herein as being performed by client device 205, in some implementations, one or more process blocks of FIG. 5 may be performed by another device or a group of devices separate from or including client device 205, such as server device 210 and ontology system 215.

As shown in FIG. 5, process 500 may include generating a set of word vectors for terms in a list of unique terms determined from a text (block 510). For example, client device 205 may generate numerical representations for each term included in the list of unique terms determined from natural language text. In some implementations, client device 205 may generate the word vectors using a vector model associated with generating word vectors (e.g., CBOW, skip gram, and/or GloVe). In some implementations, using word vectors may improve an accuracy of generating the ontology, thereby improving a performance of client device 205 when client device 205 uses the ontology to analyze and/or process natural language text.

In some implementations, client device 205 may process terms included in the list of unique terms in association with generating the set of word vectors. For example, client device 205 may replace multi-term noun phrases, such as a noun phrase that includes a noun and an adjective, with a single term (e.g., via concatenation using an underscore character). Conversely, for example, client device 205 may treat nouns and adjectives included in a noun phrase separately (e.g., by storing separate word vectors for nouns and adjectives). As another example, client device 205 may generate a single vector for multi-term noun phrases by adding together the word vectors for the individual terms included in the multi-term noun phrase. In some implementations, client device 205 may generate the set of word vectors in association with extracting terms, noun phrases, parts-of-speech, etc. from the text and may store the set of word vectors in association with the list of unique terms.

As further shown in FIG. 5, process 500 may include determining a quantity of term clusters, to be generated to form an ontology of terms in the text, based on the set of word vectors (block 520). For example, client device 205 may determine a quantity of groupings of terms to generate to form the ontology of terms. In some implementations, client device 205 may determine the quantity of term clusters based on the set of word vectors generated from the list of unique terms.

In some implementations, client device 205 may use a statistical technique to determine the quantity of term clusters to generate based on the word vectors (e.g., an optimal quantity of term clusters for the set of word vectors). For example, client device 205 may use a gap analysis, an elbow analysis, or a silhouette analysis to determine the quantity of term clusters to generate. In some implementations, when determining the quantity of term clusters to generate, client device 205 may generate a curve based on term clusters of the terms. For example, client device 205 may generate a curve that plots different quantities of term clusters on a first axis, such as an independent axis or an x-axis, and a corresponding error measurement associated with a clustering technique (e.g., a measure of gap associated with gap analysis) on a second axis, such as a dependent axis or a y-axis.

In some implementations, client device 205 may determine the quantity of term clusters based on the curve. For example, when using gap analysis to determine the quantity of term clusters, the curve may indicate that the measure of gap increases or decreases monotonically as the quantity of term clusters increases. Continuing with the previous example, the measure of gap may increase or decrease up to a particular quantity of term clusters, where the curve changes direction. In some implementations, client device 205 may identify a quantity of term clusters associated with the direction change as the quantity of term clusters to generate.

In this way, client device 205 may use a statistical technique to determine a quantity of term clusters to generate, thereby improving determination of the quantity of term clusters. In addition, this increases an efficiency of determining the quantity of term clusters, thereby improving generation of the ontology.

As further shown in FIG. 5, process 500 may include generating term clusters, representing concepts of the ontology, based on the quantity of term clusters (block 530). For example, client device 205 may generate clusters of word vectors representing concepts of the ontology (e.g., concepts of a domain). In some implementations, client device 205 may generate the quantity of term clusters based on the quantity of term clusters identified using the statistical technique.

In some implementations, client device 205 may generate the quantity of term clusters using a clustering technique. For example, client device 205 may use a recursive divisive clustering technique on the word vectors to generate the quantity of term clusters. As another example, client device 205 may use a k means clustering technique on the word vectors to generate the quantity of term clusters where, for example, client device 205 measures l1 distance (e.g., Manhattan distance) and l2 distance (e.g., Euclidean distance)

between two word vectors to determine whether to cluster two word vectors into the same term cluster.

In this way, client device 205 may generate term clusters for a set of word vectors based on determining a quantity of term clusters to generate, thereby improving the clustering of the word vectors into term clusters. In addition, this increases an efficiency of client device 205 when client device 205 is generating the term clusters, thereby improving generation of the ontology.

Table 1 below shows results of using CBOW, skip gram, GloVe (100), where 100 dimensional word vectors were used, or GloVe (300), where 300 dimensional word vectors were used, in association with generating term clusters, or identifying concepts, for natural language text data sets. Table 1 shows that the data sets used include a data set from the website "Lonely Planet," a data set from the website "Yahoo Finance," and a data set from the website "Biology News." As shown in Table 1, using CBOW resulted in an improvement, relative to using LSI, in a precision measure for the Yahoo Finance data set and an improvement in a recall measure for all three data sets. As further shown in Table 1, using skip gram resulted in an improvement, relative to using LSI, in a precision measure, and in a recall measure, for all three data sets. As further shown in Table 1, using GloVe (100) resulted in an improvement, relative to using LSI, in a precision measure for the Lonely Planet data set and the Biology New data set, and in a recall measure for the Lonely Planet and the Yahoo Finance data sets. As further shown in Table 1, using GloVe (300) resulted in an improvement, relative to using LSI, in a precision measure, and in a recall measure, for the data sets for which GloVe (300) was used.

As further shown in FIG. 5, process 500 may include generating a hierarchy of term clusters for the ontology based on the term clusters and the term sub-clusters (block 550). For example, client device 205 may determine hierarchical relationships among the term clusters and the term sub-clusters, where coarse or general concepts represented by the term clusters are at a higher level in the hierarchy (e.g., relative to granular or specific concepts represented by the term sub-clusters). In some implementations, client device 205 may generate the hierarchy for the ontology based on determining the hierarchical relationships among the term clusters and the term sub-clusters. For example, client device 205 may generate the hierarchy based on determining that a hierarchical relationship exists between a term cluster that includes countries, such as India, France, and United States, and a term sub-cluster that includes cities, such as Bangalore, Paris, and Washington, D.C.

In some implementations, client device 205 may determine the hierarchical relationships based on clustering the terms. For example, when client device 205 clusters terms included in a term cluster to determine term sub-clusters, client device 205 may determine that the resulting term sub-clusters are hierarchically related to the term cluster.

As further shown in FIG. 5, process 500 may include determining names for one or more term clusters included in the ontology (block 560). For example, client device 205 may determine human-readable names for the term clusters, such as "location," "country," "city," or "continent." In some implementations, client device 205 may use the names to provide a human-readable ontology of the terms for display (e.g., via a user interface associated with client device 205), as described below.

TABLE 1

Quality of Generated Concepts - Precision, Recall

| Data Set | Noun Phrase Count | Concept Identification Model | | | | |
| --- | --- | --- | --- | --- | --- | --- |
| | | LSI | CBOW | Skip Gram | GloVe (100) | GloVe (300) |
| Lonely Planet | 24660 | 0.56, 0.80 | 0.54, 0.87 | 0.73, 0.87 | 0.69, 0.84 | 0.58, 0.84 |
| Yahoo Finance | 33939 | 0.67, 0.72 | 0.73, 0.81 | 0.73, 0.81 | 0.67, 0.85 | Not Done |
| Biology News | 20582 | 0.50, 0.89 | 0.50, 0.95 | 0.58, 0.94 | 0.62, 0.83 | 0.54, 0.94 |

As further shown in FIG. 5, process 500 may include determining term sub-clusters representing sub-concepts of the ontology (block 540). For example, client device 205 may cluster the word vectors associated with each term cluster into term sub-clusters. In some implementations, the term sub-clusters may represent sub-concepts of the ontology (e.g., sub-concepts of concepts).

In some implementations, client device 205 may determine the term sub-clusters using a clustering technique in a manner similar to that described above with respect to term clusters (e.g., by determining a quantity of term sub-clusters). This increases an efficiency of determining term sub-clusters, thereby conserving computing resources of client device 205. In some implementations, client device 205 may perform multiple iterations of clustering. For example, client device 205 may determine term sub-sub clusters (e.g., term sub-clusters of term sub-clusters). In some implementations, client device 205 may perform the multiple iterations of clustering until client device 205 cannot further divide the term clusters into term sub-clusters (e.g., until a monotone behavior of a gap statistic becomes dull). In some implementations, client device 205 may determine different quantities of term sub-clusters for different term clusters.

In some implementations, client device 205 may use a lexical resource to determine the names for the term clusters. For example, client device 205 may use an electronic dictionary or a lexical database, such as WordNet, to determine the names for the term clusters. In some implementations, client device 205 may determine whether terms associated with the term clusters are stored in the lexical resource. For example, client device 205 may compare the terms of the term clusters and the terms stored in the lexical resource and may determine names for the term clusters when the comparison indicates a match.

In some implementations, a result of the comparison may identify multiple terms of the term clusters that are included in the lexical resource. In some implementations, when the result of the comparison identifies multiple terms, client device 205 may select one of the multiple terms as the name for the term cluster (e.g., randomly select the name or select the name using criteria). Additionally, or alternatively, client device 205 may provide the multiple terms for display, thereby enabling a user of client device 205 to select one of the multiple terms as the name of the term cluster.

In some implementations, client device 205 may determine names for the term clusters based on a semantic relationship among the terms of the term clusters. For example, client device 205 may use an algorithm to identify lexico-syntactic patterns, such as Hearst patterns, among the terms of the term clusters. Continuing with the previous example, client device 205 may use an algorithm to identify a semantic relationship between the terms "countries" and "France" in the natural language text "countries such as France," such that when the term "France" is included in a term cluster, client device 205 may determine to use the term "countries" as the name for the term cluster that includes the term "France."

In some implementations, client device 205 may determine names for the term clusters based on identifying a term cluster centroid of each term cluster. For example, client device 205 may identify a central word vector of word vectors representing terms of a term cluster. In some implementations, client device 205 may use the term associated with the term cluster centroid as the name for the term cluster. Additionally, or alternatively, client device 205 may provide the term associated with the term cluster centroid for display, thereby enabling a user of client device 205 to provide an indication of whether to use the term as the name for the term cluster. In some implementations, client device 205 may provide multiple terms for display (e.g., the term associated with the term cluster centroid and terms associated with word vectors within a threshold distance from the term cluster centroid), thereby enabling the user to select a term from multiple terms as the name for the term cluster.

In some implementations, client device 205 may determine names for term sub-clusters in a manner similar to that which was described with respect to determining names for term clusters. In some implementations, client device 205 may use the above described techniques for determining names of term clusters and/or a term sub-clusters in a hierarchical manner. For example, client device 205 may attempt to determine the names for the term clusters and/or the term sub-clusters using a lexical resource prior to determining the names based on a semantic relationship, and prior to determining the names based on term cluster centroids.

In this way, client device 205 may determine names for term clusters and/or term sub-clusters, thereby enabling client device 205 to provide a human-readable ontology for display.

As further shown in FIG. 5, process 500 may include determining non-hierarchical relationships between terms included in the ontology (block 570) and may include determining attributes for relationships between terms included in the ontology (block 580). For example, client device 205 may determine non-hierarchical relationships between concepts of a domain. As another example, client device 205 may determine attributes of the concepts that characterize the concepts. In some implementations, client device 205 may map the terms included in the term clusters or the term sub-clusters to concepts, thereby enabling client device 205 to determine the non-hierarchical relationships between the terms included in the ontology and attributes for relationships between the terms included in the ontology.

In some implementations, client device 205 may use a technique for determining the non-hierarchical relationships and/or the attributes. In some implementations, client device 205 may perform a frequency analysis to determine the non-hierarchical relationships and/or the attributes of the relationships between the terms. For example, client device 205 may perform a frequency analysis to determine a frequency of occurrence of terms appearing in a particular semantic relationship (e.g., a Hearst pattern or an adjectival form). As another example, client device 205 may perform a frequency analysis to determine a frequency of occurrence of terms appearing in a subject-verb-object (SVO) tuple (e.g., a phrase or clause that contains a subject, a verb, and an object).

In some implementations, client device 205 may use a result of the frequency analysis to identify non-hierarchical relationships and/or attributes of the relationships between the terms of the ontology. For example, client device 205 may identify that the term "nationality" is an attribute of the term "person" based on determining that a result of a frequency analysis indicates that a frequency of occurrence of the terms "nationality" and "person" exceeds a threshold frequency of occurrence. As another example, client device 205 may identify a non-taxonomical relationship between the concepts physician, cures, and disease based on determining that a result of a frequency analysis indicates that that a frequency of occurrence of SVO tuples, such as "doctor treated fever" or "neurologist healed amnesia," which include the concepts physician, cures, and disease, exceeds a threshold frequency of occurrence.

In some implementations, client device 205 may replace terms with a term cluster name in association with performing a frequency analysis. For example, using the natural language text from above, client device 205 may replace the terms "doctor" and "neurologist" with "physician," the terms "treated" and "healed" with "cures," and the terms "fever" and "amnesia" with "disease." This improves a frequency analysis by enabling client device 205 to more readily determine a frequency of terms.

Additionally, or alternatively, client device 205 may use a non-frequency-based analysis for determining non-taxonomical relationships and/or attributes for relationships between the terms. For example, client device 205 may use a word vector-based technique for determining the non-taxonomical relationships and/or the attributes. In some implementations, when using a word vector-based technique, client device 205 may search combinations of terms in two or more term clusters and/or term sub-clusters (e.g., by searching a combination of two terms or a combination of three terms). In some implementations, client device 205 may identify combinations of terms that are included together in the term clusters or the term sub-clusters. In some implementations, client device 205 may identify non-taxonomical relationships or attributes for the relationships where the distance between corresponding word vectors of the terms satisfies a threshold (e.g., are within a threshold distance of one another).

As further shown in FIG. 5, process 500 may include outputting the ontology, the names, the non-hierarchical relationships, and/or the attributes (block 590). For example, client device 205 may provide the ontology, the names, the non-hierarchical relationships, and/or the attributes to another device (e.g., to enable the other device to process natural language text, such as to automatically classify the natural language text, to automatically extract information from the natural language text, etc.). As another example, client device 205 may output the ontology, the names, the non-hierarchical relationships, and/or the attributes for display (e.g., via a user interface associated with client device 205), thereby enabling a user to visualize the ontology, the names, the non-hierarchical relationships, and/or the attributes.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
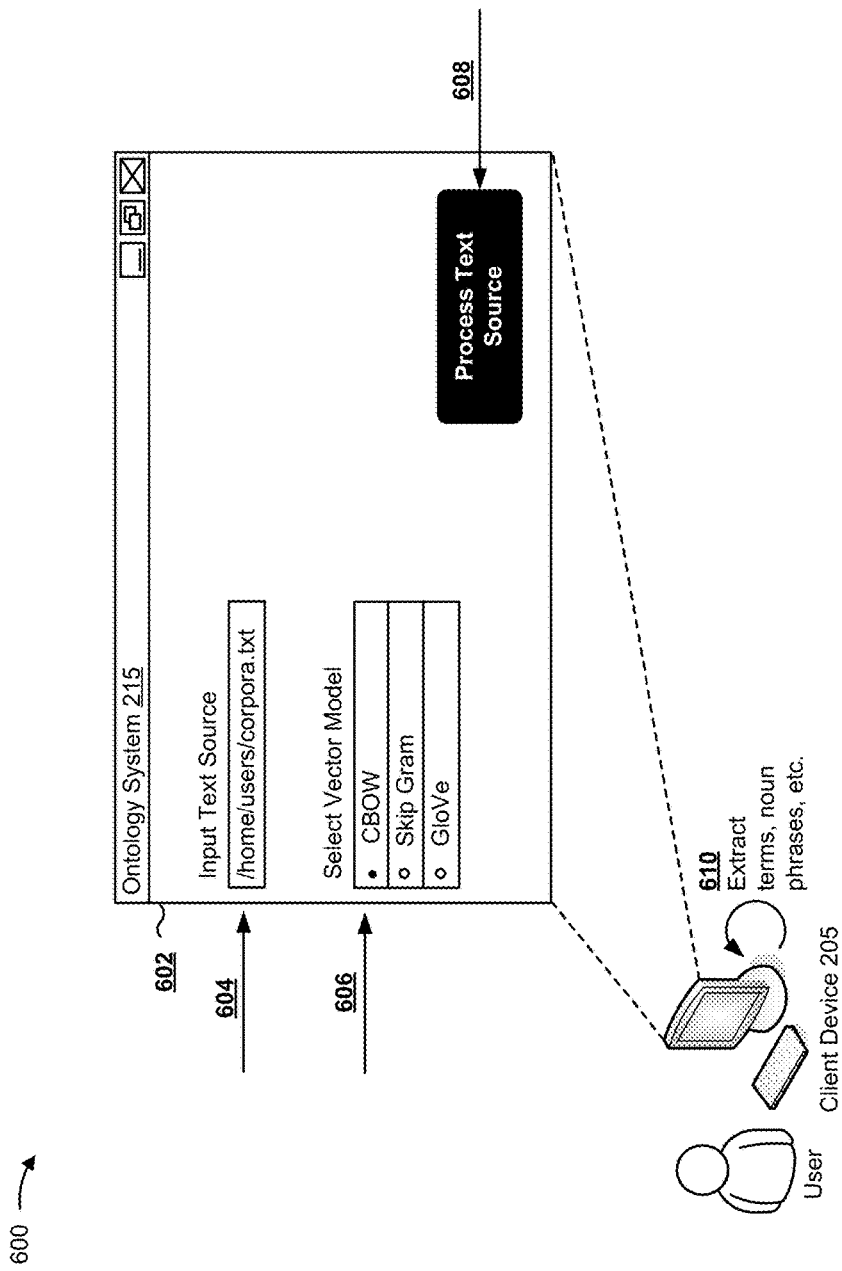
FIGS. 6A-6F are diagrams of an example implementation relating to the example process shown in FIG. 5.

FIGS. 6A-6F are diagrams of an example implementation 600 relating to example process 500 shown in FIG. 5. As shown in FIG. 6A, client device 205 may provide user interface 602 for display. As shown by reference number 604, user interface 602 may permit a user of client device 205 to input information identifying a text source for text (e.g., input a file path for a text file or input a uniform resource locator (URL) of a website, shown as "/home/users/corpora.txt" in FIG. 6A). As shown by reference number 606, user interface 602 may permit the user to select a vector model for generating word vectors for terms included in the text (e.g., a CBOW vector model, a skip gram vector model, or a GloVe vector model). For example, assume that the user has selected CBOW as the vector model for generating word vectors.

As shown by reference number 608, the user may select a "Process Text Source" button, which may cause client device 205 to extract terms, noun phrases, etc. from the text. As shown by reference number 610, client device 205 may extract terms, noun phrases, etc. from the text based on the user inputting information identifying a text source, selecting a vector model, and selecting the "Process Text Source" button. In some implementations, client device 205 may cluster the terms, noun phrases, etc. to generate term clusters and/or term sub-clusters in association with extracting the terms, noun phrases, etc.

Figure 6B:
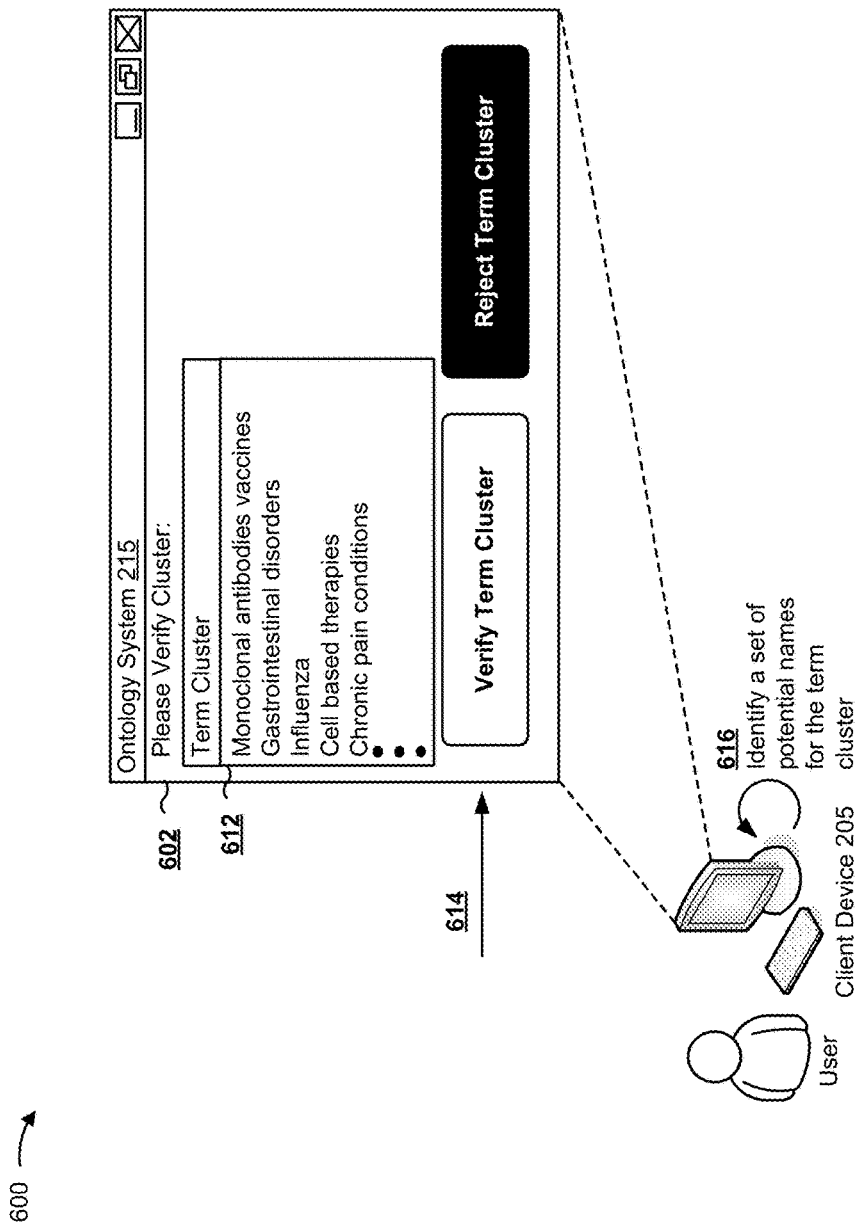

As shown in FIG. 6B, and by reference number 612, user interface 602 may display a term cluster that includes terms, noun phrases, etc. extracted from the text. In some implementations, user interface 602 may display multiple term clusters. User interface 602 may provide buttons (e.g., a "Verify Term Cluster" button and a "Reject Term Cluster" button). In some implementations, the user may use the buttons to indicate whether the term clusters generated by client device 205 include related terms (e.g., terms associated with the same domain, concept, or sub-concept).

For example, user selection of the "Verify Term Cluster" button may indicate that the displayed term cluster includes related terms and may cause client device 205 to determine a name for the term cluster, as described below. Conversely, for example, user selection of the "Reject Term Cluster" button may indicate that the displayed term cluster does not include related terms and may cause client device 205 to re-cluster the terms of the text. As shown by reference number 614, assume that the user has selected the "Verify Term Cluster" button. As shown by reference number 616, client device 205 may identify a set of potential names for the term cluster based on user selection of the "Verify Term Cluster" button.

Figure 6C:
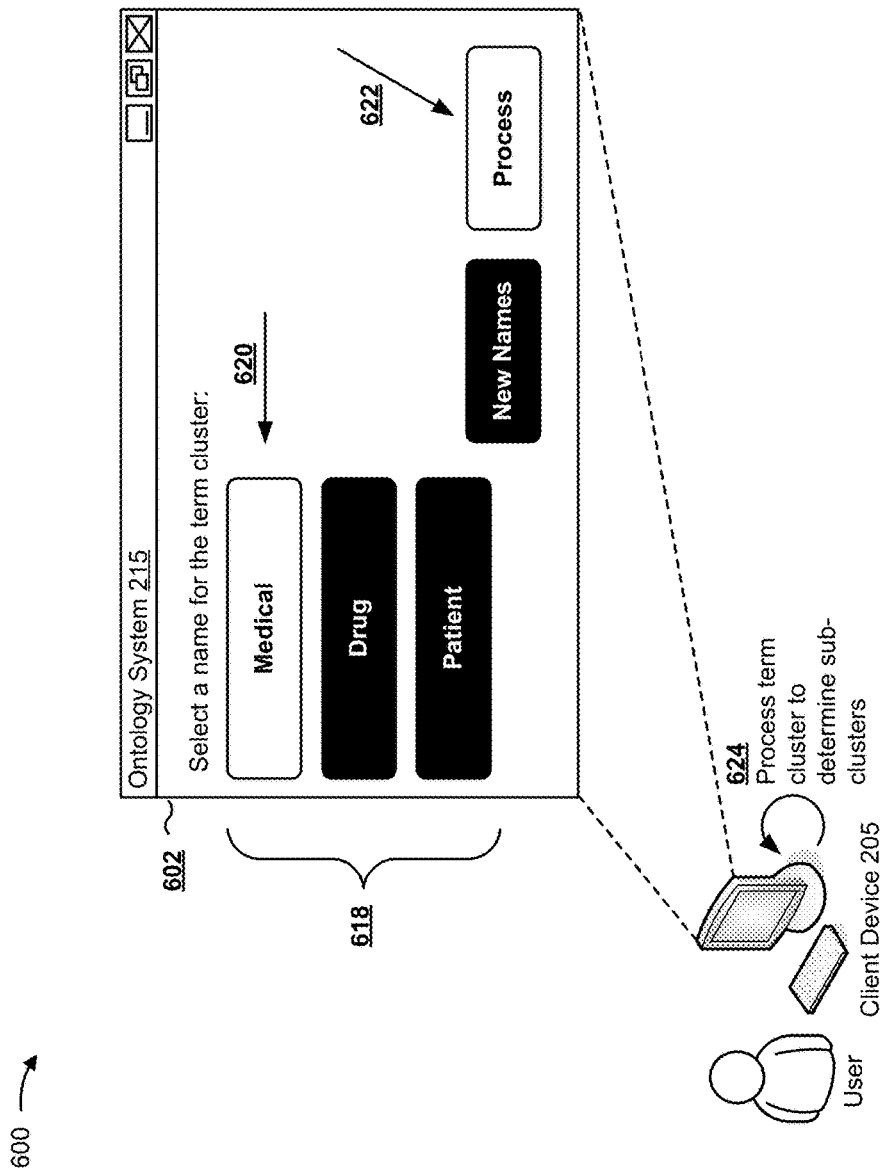

As shown in FIG. 6C, and by reference number 618, user interface 602 may display the set of potential names for the term cluster based on identifying the set of potential names for the term cluster. In some implementations, user interface 602 may permit the user to select a name, from the set of potential names, as the name for the term cluster. In some implementations, selection of a name from the set of potential names may cause client device 205 to name the term cluster based on the user selection. As shown by reference number 620, assume that the user selects the name "Medical" as the name for the term cluster.

As shown user interface 602 may display buttons (e.g., a "New Names" button and a "Process" button). Selection of the "New Names" button may cause client device 205 to identify and display a different set of potential names for the term cluster. Conversely, selection of the "Process" button may cause client device 205 to process the term cluster (e.g., by clustering terms of the term cluster into term sub-clusters). As shown by reference number 622, assume that the user has selected the "Process" button. As shown by reference number 624, client device 205 may process the term cluster to determine term sub-clusters based on the user selecting a name for the term cluster and selecting the "Process" button.

Figure 6D:
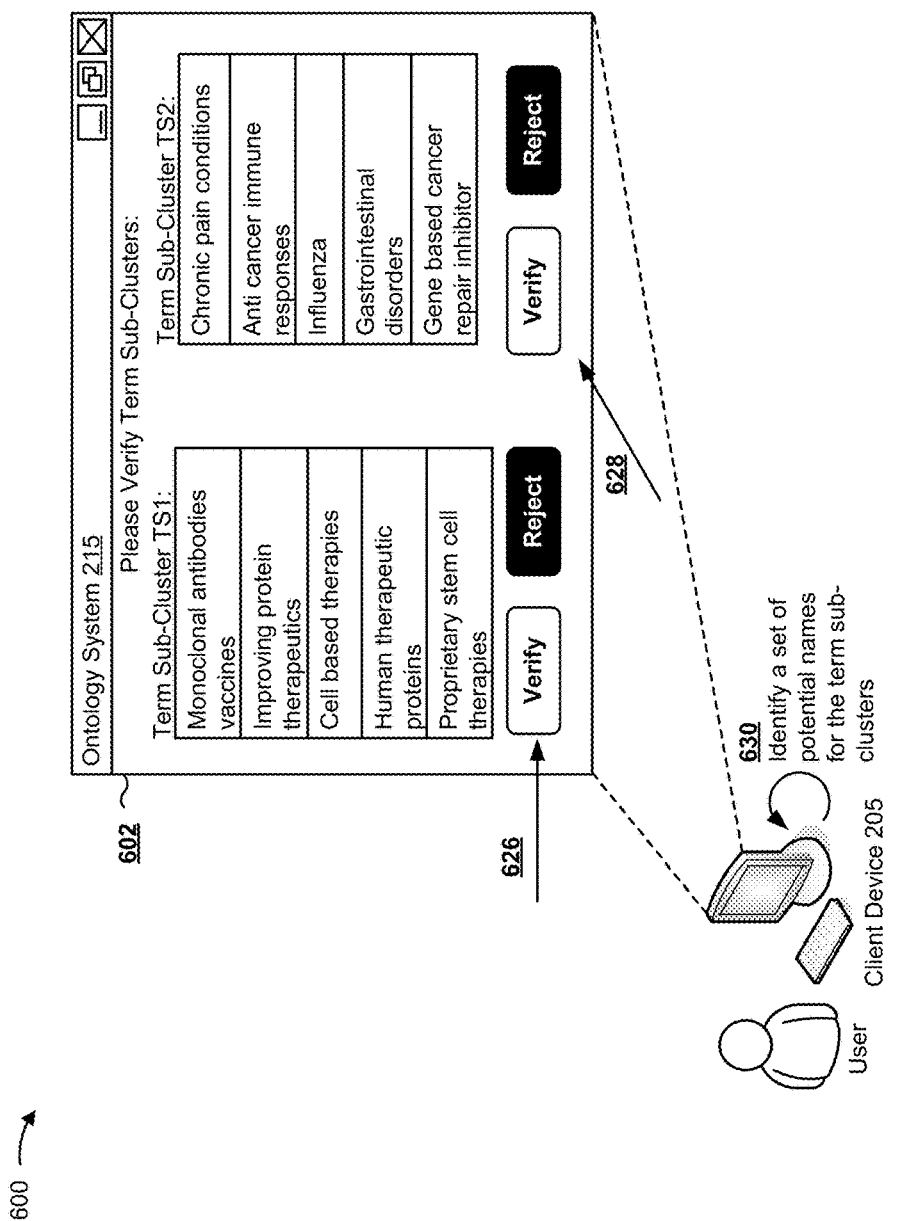

As shown in FIG. 6D, user interface 602 may display term sub-cluster TS1 and term sub-cluster TS2 based on processing the term cluster to determine term sub-clusters. As further shown in FIG. 6D, user interface 602 may display buttons (e.g., a "Verify" button and a "Reject" button) for each term sub-cluster, selection of which may cause client device 205 to perform actions similar to that which were described above with respect to the "Verify Term Cluster" and "Reject Term Cluster" buttons shown in FIG. 6B. As shown by reference numbers 626 and 628 assume that the user has selected the "Verify" buttons for term sub-clusters TS1 and TS2. As shown by reference number 630, client device 205 may identify a set of potential names for term sub-clusters TS1 and TS2, in a manner similar to that which was described above with respect FIG. 6B for identifying a set of potential names for the term cluster, based on the user selecting the "Verify" buttons.

Figure 6E:
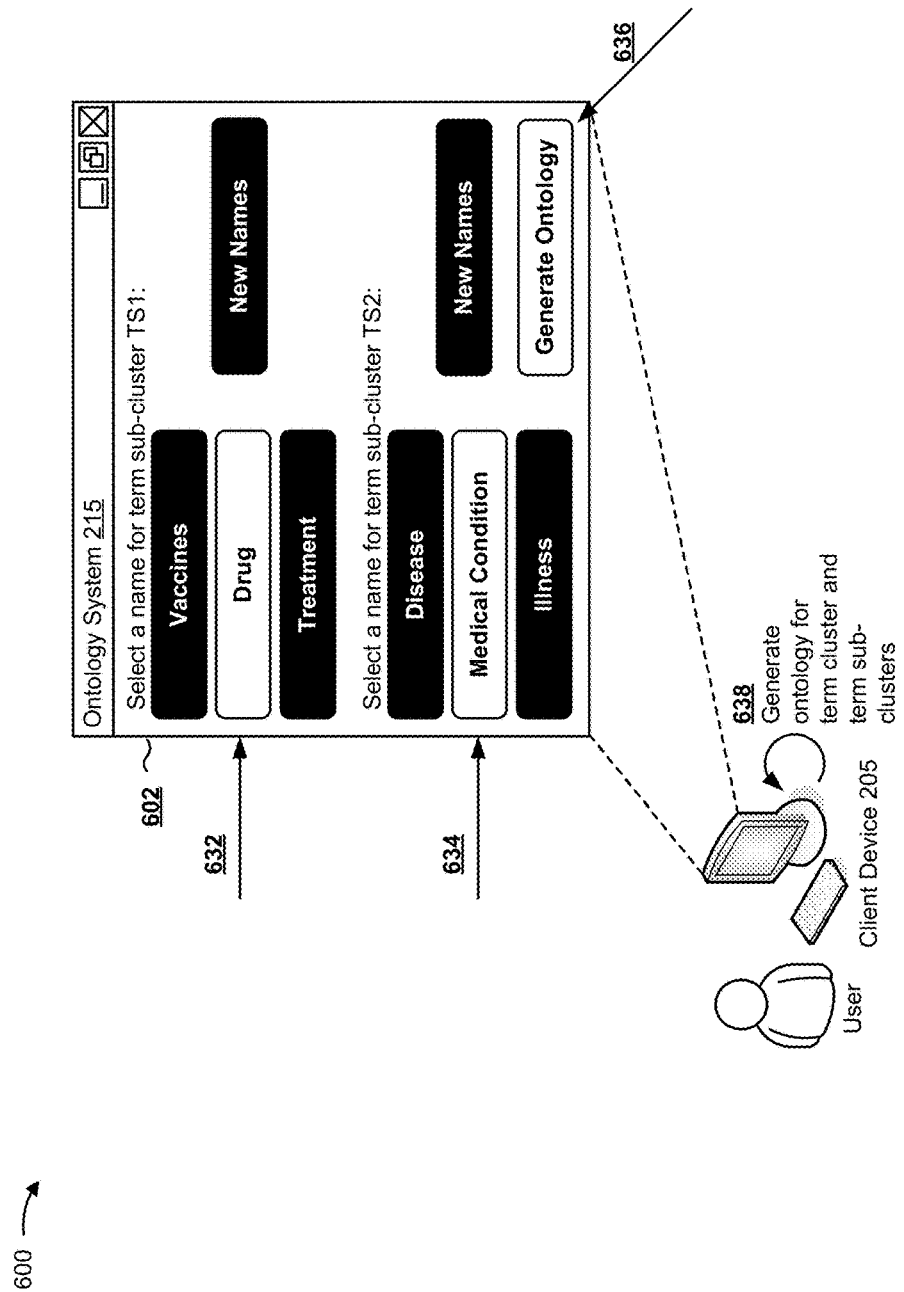

As shown in FIG. 6E, user interface 602 may display a first set of potential names for term sub-cluster TS1 and a second set of potential names for term sub-cluster TS2. As shown by reference number 632, the user may select "Drug" as the name for term sub-cluster TS1. As shown by reference number 634, the user may select "Medical Condition" as the name of term sub-cluster TS2. As further shown in FIG. 6E, user interface 602 may display buttons (e.g., a "New Names" button associated with each term sub-cluster and a "Generate Ontology" button). Selection of the "New Names" buttons may cause client device 205 to generate a different set of potential names for the associated term sub-clusters. Conversely, selection of the "Generate Ontology" button may cause client device 205 to generate an ontology based on the term cluster, term sub-clusters 1, and term sub-cluster TS2. As shown by reference number 636, assume that the user has selected the "Generate Ontology" button. As shown by reference number 638, client device 205 may generate the ontology for the term cluster, term sub-clusters 1, and term sub-cluster TS2 based on the user selecting the names for term sub-clusters TS1 and TS2 and selecting the "Generate Ontology" button.

Figure 6F:
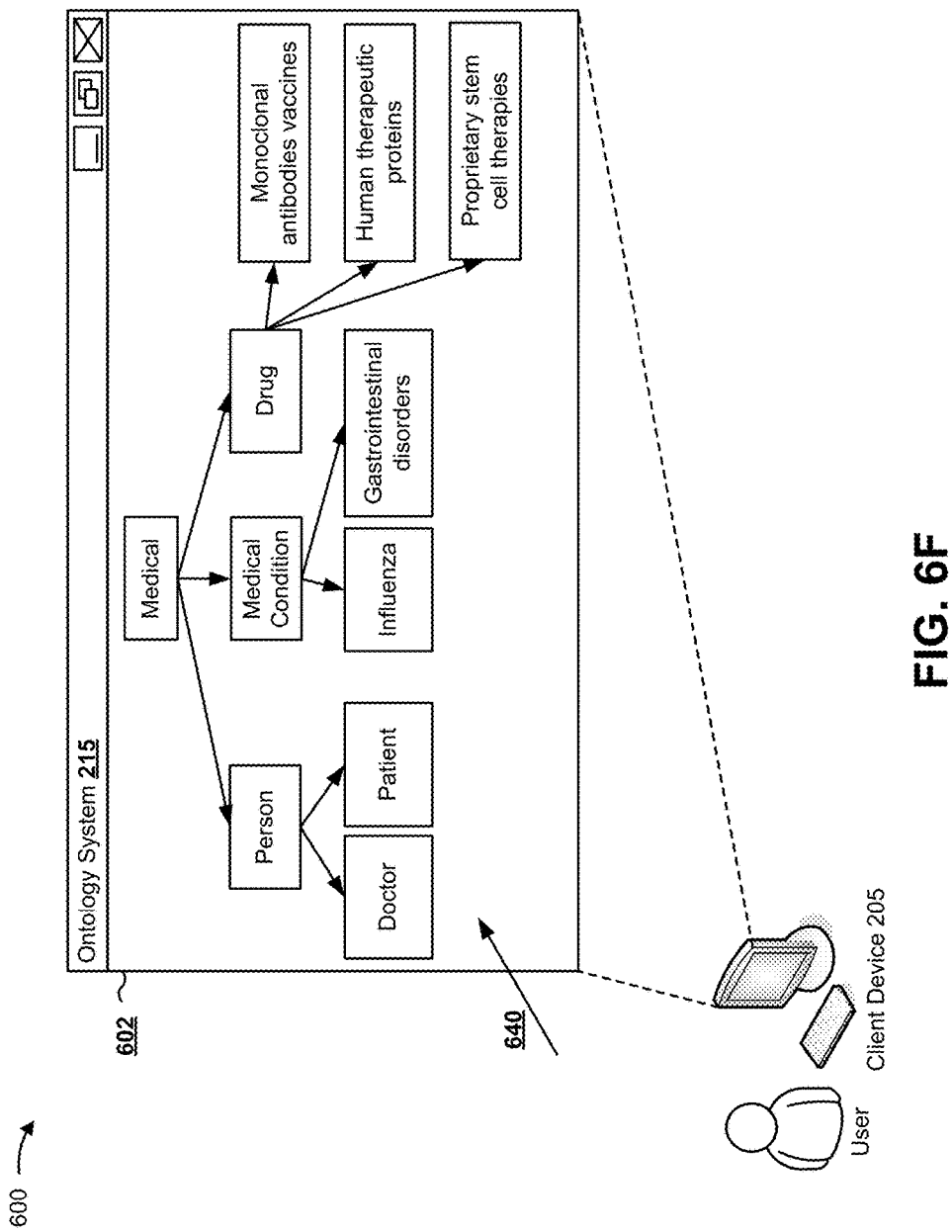

As shown in FIG. 6F, and by reference number 640, user interface 602 may display a graphical representation of the ontology generated by client device 205. For example, the graphical representation may include a "Medical" concept of a domain, corresponding to the term cluster. As another example, the graphical representation may include sub-concepts of the concept, corresponding to term sub-clusters (e.g., shown as "Person," "Medical Condition," and "Drug"). As another example, the graphical representation may include sub-concepts of the sub-concepts (e.g., shown as "doctor," "patient," "influenza," "gastrointestinal disorders," "monoclonal antibodies vaccines," "human therapeutic proteins," or "proprietary stem cell therapies."

In this way, client device 205 may generate an ontology of terms for a text source, thereby enabling client device 205 to analyze and/or process text sources for information using the ontology. In addition, client device 205 may provide the ontology for display, thereby enabling a user of client device 205 to visualize and/or interpret the ontology.

As indicated above, FIGS. 6A-6F are provided merely as an example. Other examples are possible and may differ from what was described with regard to FIGS. 6A-6F.

Implementations described herein may enable a client device to generate an ontology of terms using word vectors and a technique for clustering the word vectors. This may reduce an amount of time for generating the ontology, thereby conserving processor resources of client device 205. In addition, this improves generation of the ontology by increasing an accuracy of identifying concepts, sub-concepts, attributes, hierarchical relationships, and/or non-hierarchical relationships. This improves a performance of the client device when the client device uses the ontology to analyze and/or process natural language text.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   generate a set of distributed word vectors from a list of terms determined from a text using a vector model associated with generating the set of distributed word vectors,
   the set of distributed word vectors representing a plurality of real numbers for each term in the list of terms;
   determine a quantity of term clusters, to be generated to form an ontology of terms in the text, based on the set of distributed word vectors and using a statistical technique;
   generate term clusters, representing concepts of the ontology of terms, based on the quantity of term clusters and using a recursive divisive clustering technique;
   perform a frequency analysis for terms included in the ontology of terms;
   determine non-hierarchical relationships or attributes for relationships between the terms included in the ontology of terms based on the frequency analysis; and
   output the term clusters, and data identifying the non-hierarchical relationships or attributes for relationships, to permit another device to analyze a set of documents using the term clusters.

2. The device of claim 1, where the one or more processors are further to:
   determine term sub-clusters representing sub-concepts of the ontology of terms; and
   generate a hierarchy of term clusters for the ontology of terms based on the term clusters and the term sub-clusters.

3. The device of claim 1, where the one or more processors are further to:
   receive an indication to determine the non-hierarchical relationships between the terms included in the ontology of terms; and
   determine the non-hierarchical relationships between the terms included in the ontology of terms.

4. The device of claim 1, where the one or more processors are further to:
   receive an indication to determine names for the term clusters included in the ontology of terms; and
   determine, based on an algorithm to identify a semantic relationship between the terms included in the term clusters, the names for the term clusters included in the ontology of terms.

5. The device of claim 1, where the vector model associated with generating the set of distributed word vectors includes:
a continuous bag of words (CBOW) vector model,
a skip gram vector model, or
a global vector (GloVe) vector model.

6. The device of claim 1, where the statistical technique includes:
a gap analysis,
an elbow analysis, or
a silhouette analysis.

7. The device of claim 1, where the recursive divisive clustering technique
applies a k means clustering technique.

8. The device of claim 1, where the one or more processors are further to:
output the ontology, data identifying the non-hierarchical relationships, or data identifying the attributes for the relationships, for display via a user interface associated with separate device.

9. A non-transitory computer-readable medium storing instructions, the instructions comprising:
one or more instructions that, when executed by one or more processors, cause the one or more processors to:
receive a text, from a text source, in association with a request to generate an ontology for the text;
generate a set of distributed word vectors from a list of terms determined from the text,
the set of distributed word vectors representing a plurality of real numbers for each term in the list of terms;
determine a quantity of term clusters to be generated to form the ontology based on the set of distributed word vectors;
generate term clusters based on the quantity of term clusters and using a recursive divisive clustering technique,
the term clusters being associated with concepts of the ontology;
perform a frequency analysis for terms included in the ontology;
determine non-hierarchical relationships or attributes for relationships between the terms included in the ontology based on the frequency analysis; and
provide the term clusters, and data identifying the non-hierarchical relationships or attributes for relationships, for display via a user interface associated with a device.

10. The non-transitory computer-readable medium of claim 9, where the one or more instructions, when executed by the one or more processors, further cause the one or more processors to:
identify a first term cluster;
use the recursive divisive clustering technique to cluster the set of distributed word vectors associated with the first term cluster to form a first term sub-cluster;
identify a second term cluster; and
use the recursive divisive clustering technique to cluster the set of distributed word vectors associated with the second term cluster to form a second term sub-cluster.

11. The non-transitory computer-readable medium of claim 9, where the one or more instructions, when executed by the one or more processors, further cause the one or more processors to:
identify a first term cluster;
identify a first term sub-cluster;
determine that the first term sub-cluster is a subset of the first term cluster; and
generate a hierarchy of the first term cluster and the first term sub-cluster based on determining that the first term sub-cluster is the subset of the first term cluster.

12. The non-transitory computer-readable medium of claim 9, where the one or more instructions, when executed by the one or more processors, further cause the one or more processors to:
identify one or more terms of the term clusters;
perform a comparison of the one or more terms and a set of terms stored in a lexical resource; and
determine names for the term clusters where the comparison indicates a match.

13. The non-transitory computer-readable medium of claim 9, where the one or more instructions, when executed by the one or more processors, further cause the one or more processors to:
identify a first term cluster;
identify a second term cluster;
determine that the first term cluster is associated with the second term cluster; and
determine a first non-hierarchical relationship, of the non-hierarchical relationships, between the first term cluster and the second term cluster based on determining that the first term cluster is associated with the second term cluster, or
determine a first attribute, of the attributes for relationships, for a first relationship between the first term cluster and the second term cluster based on determining that the first term cluster is associated with the second term cluster.

14. The non-transitory computer-readable medium of claim 9, where the one or more instructions, that cause the one or more processors to determine the quantity of term clusters, cause the one or more processors to:
generate a curve that identifies a plurality of quantities of term clusters and a plurality of values of an error statistic associated with the plurality of quantities of term clusters; and
identify the quantity of term clusters based on the plurality of values of the error statistic.

15. The non-transitory computer-readable medium of claim 9, where the one or more instructions, when executed by the one or more processors, further cause the one or more processors to:
receive an indication via the user interface that terms of the term clusters are not related;
re-generate the term clusters based on receiving the indication; and
re-provide the term clusters for display based on re-generating the term clusters.

16. A method, comprising:
generating, by a device, a set of distributed word vectors from a list of terms determined from a text,
the set of distributed word vectors representing a plurality of real numbers for each term in the list of terms;
determining, by the device, a quantity of term clusters, to be generated to form an ontology of terms in the text, based on the set of distributed word vectors;
generating, by the device, term clusters based on the quantity of term clusters and using a recursive divisive clustering technique;
determining, by the device, term sub-clusters associated with the term clusters;

generating, by the device, a hierarchy of term clusters for the ontology of terms based on the term clusters and the term sub-clusters;

performing, by the device, a frequency analysis for terms included in the ontology of terms;

determining, by the device, non-hierarchical relationships or attributes for relationships between the terms included in the ontology of terms based on the frequency analysis; and providing, by the device, the term clusters, data identifying the non-hierarchical relationships or attributes for relationships, and the term sub-clusters to permit processing of another text.

17. The method of claim 16, further comprising:

determining names for the term clusters and the term sub-clusters by:

using a lexical resource to identify the names for the term clusters and the term sub-clusters, using a semantic relationship between two or more terms of the term clusters and the term sub-clusters to identify the names for the term clusters and the term sub-clusters, or using a term cluster centroid or a term sub-cluster centroid to identify the names for the term clusters and the term sub-clusters.

18. The method of claim 16, where performing the frequency analysis comprises:

determining a first frequency of occurrence of a plurality of terms, of the terms included in the ontology of terms, appearing in a semantic relationship, or determining a second frequency of occurrence of the plurality of terms appearing in a subject-verb-object (SVO) tuple; and determining that the first frequency of occurrence or the second frequency of occurrence exceeds a threshold frequency.

19. The method of claim 16, further comprising:

generating the ontology of terms based on:

the term clusters representing concepts of the ontology of terms, the term sub-clusters representing sub-concepts of the ontology of terms, or the hierarchy of term clusters identifying which term sub-clusters are associated with the term clusters.

20. The method of claim 16, where the device is a client device.

* * * * *